(12) United States Patent
Nilsson

(10) Patent No.: US 6,860,226 B2
(45) Date of Patent: Mar. 1, 2005

(54) METHOD AND AN APPARATUS FOR EXAMINATION OF MILKING ANIMALS

(75) Inventor: Mats Nilsson, Tumba (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 10/311,469

(22) PCT Filed: Jul. 6, 2001

(86) PCT No.: PCT/SE01/01574
§ 371 (c)(1),
(2), (4) Date: Dec. 16, 2002

(87) PCT Pub. No.: WO02/07098
PCT Pub. Date: Jan. 24, 2002

(65) Prior Publication Data
US 2003/0145795 A1 Aug. 7, 2003

(30) Foreign Application Priority Data
Jul. 19, 2000 (SE) .............................................. 0002720

(51) Int. Cl.⁷ .................................................. A01J 5/00
(52) U.S. Cl. .................................. 119/14.02; 119/14.18
(58) Field of Search ............................ 119/14.02, 14.1, 119/14.18

(56) References Cited

U.S. PATENT DOCUMENTS

| | | | | |
|---|---|---|---|---|
| 5,934,220 A | * | 8/1999 | Hall et al. ................ | 119/14.08 |
| 6,227,142 B1 | * | 5/2001 | Birk ......................... | 119/14.08 |
| 6,377,353 B1 | * | 4/2002 | Ellis ......................... | 356/603 |
| 6,394,028 B1 | * | 5/2002 | Birk ......................... | 119/14.08 |
| 6,476,574 B1 | * | 11/2002 | Nilsson et al. ......... | 318/568.11 |
| 6,553,942 B1 | * | 4/2003 | Eriksson .................... | 119/670 |
| 2002/0000204 A1 | * | 1/2002 | van der Lely et al. .... | 119/14.02 |

FOREIGN PATENT DOCUMENTS

| | | | |
|---|---|---|---|
| EP | 0349019 A2 | * | 1/1990 |
| GB | 2 272 971 A | | 6/1994 |
| WO | WO96/20587 | * | 7/1996 |
| WO | WO 97/15901 A1 | | 5/1997 |
| WO | WO 98/45808 A1 | | 10/1998 |
| WO | WO 00/67562 A1 | | 11/2000 |
| WO | WO01/19172 A1 | * | 3/2001 |

* cited by examiner

Primary Examiner—Robert P. Swiatek
(74) Attorney, Agent, or Firm—Birch, Stewart, Kolasch & Birch, LLP

(57) ABSTRACT

A method and an apparatus for examining at least a first animal, milked in a milking machine, comprising an identification device for identifying said animal, a storing device for storing said identification in a data base, a locating device for finding the position of the teats of said animal, a cleaning device for cleaning the teats of the animal, an applying device for applying teat cups to the teats of said animal, and a capturing device for capturing at least one image of at least a part of said animal. The image captured in relation to identification of the animal is stored in the data base, and the captured image is presented for a user through a viewing device coupled to the data base.

17 Claims, 4 Drawing Sheets

|  | ID | IMAGE | DATE | TIME | CELL COUNT | ORDER COMMENT |
|---|---|---|---|---|---|---|
| 41— | 11 | Picture 1 | 20010102 | 08:15 | 1,1 | |
| 42— | 11 | Picture 2 | 20000102 | 08:16 | 1,1 | |
| | - | | | | | |
| | - | | | | | |
| | - | | | | | |
| | - | | | | | |
| 43— | 11 | Picture 11 | 20010102 | 15:45 | 1,4 | Separate |
| 44— | 11 | Picture 12 | 20010102 | 15:46 | 1,4 | |

Fig. 4

METHOD AND AN APPARATUS FOR EXAMINATION OF MILKING ANIMALS

This application is the national phase under 35 U.S.C. §371 of PCT International Application No. PCT/SE01/01574 which has an International filing date of Jul. 6, 2001, which designated the United States of America.

FIELD OF THE INVENTION

The present invention relates to a method of examining a milking animal, an apparatus for examining a milking animal and to an automatic milking machine.

RELATED ART AND BACKGROUND OF THE INVENTION

The milking of cows has been highly automated in recent years. Automatic milking machines, electronic cow identification systems and computer operated feeding stations are gaining wide acceptance to improve productivity and efficiency.

In automatic milking machines, teat cups are applied to a cow's teats, a pulsating pneumatic or vacuum source is applied to the teat cups to effect milking, and the resulting milk is drawn by a vacuum from the teats to a milk collection tank.

One implication with automatic milking machines is that the farmer need not be present at the milking event. This has the effect that the teats of the milked animal are not visually inspected when automatic milking machines are employed. Previously, with manual application of teat cups, the farmer had the possibility to see and feel the teats of the animal noting whenever an animal, for instance had an injury, or was extremely dirty.

GB 2 272 971 describes a method of examining milking animals. That method comprises the steps of preparing an image reference record of an animal, subsequently preparing a further image record of an animal at a presentation for milking, comparing the reference and further image records, determining differences from said comparison and deciding from any said differences whether the animal presenting for milking is to be milked at this presentation. The reference image of GB 2 272 971 necessarily needs to be an image of clean teats since the image is used as reference for detecting dirt. Thus, the reference image is an image of a teat that has been manually prepared and is thus not an image suitable for detecting a specific teat condition.

SUMMARY OF THE INVENTION

It is an object of the present invention to provide a method and an apparatus for examining milking animals which overcomes or at least reduces the above-mentioned problem.

According to the present invention this object is obtained by providing a method for examining an animal, an apparatus for examining an animal, and an automatic milking machine suitable for executing the method of the invention.

An advantage of the present invention is that the farmer may examine captured images, stored in a database, of the teats and/or udder at any time after the milking event(s) at his/her convenience and that the captured image is displayed in a format suitable for visually inspecting the teats of the animal. Furthermore the images of the teats of the milking animal are captured automatically without the need for the presence of the farmer, thus giving the farmer the possibility to later visually inspect the teats without having to be present at the milking event.

Another advantage with a preferred embodiment is that two or more images may be presented beside each other, so that the farmer may easily compare them. Said two images may be images captured at different times or at the same time but with different views.

Another advantage with a preferred embodiment of the invention is that the user viewing the images may feed in comments or orders to be stored in a database in relation to the identity of the animal. Thus, it is possible for the user to give order to the automatic milking machine that the animal associated with the viewed image may be treated in a special way the next time the animal presents itself for milking, such as being guided to a special enclosure or having a lotion applied to the teat etc.

Another advantage of a preferred embodiment of the present invention is that the captured images may be selected considering special criteria such as the movability of the cow during the milking event, previously injured teat(s) and/or udder of a certain milking animal or milking animals which tend to be injured.

Yet another advantage of a preferred embodiment of the present invention is that the comparison of the captured images may be automatically performed by comparing pixels and/or a pattern of one captured image with a corresponding pixel and/or pattern of another captured image and marking and/or sorting out those captured images in which more than a predefined number of those pixels differ in colour from each other and/or in which the pattern differs more than a predefined value, such as area differences, colour differences etc.

Still another advantage of the present invention is that the method is easy to implement in an already existing automatic milking machine.

Still another advantage of the present invention is that a large set of animals is conveniently examined in a batch.

BRIEF DESCRIPTION OF THE DRAWINGS

FIG. 2b is a perspective view showing an enlargement of a multipurpose arm of the milking machine shown in FIG. 2a.

FIG. 4 is a table in a database illustrated in FIG. 3.

DESCRIPTION OF PREFERRED EMBODIMENTS

Figure 1:
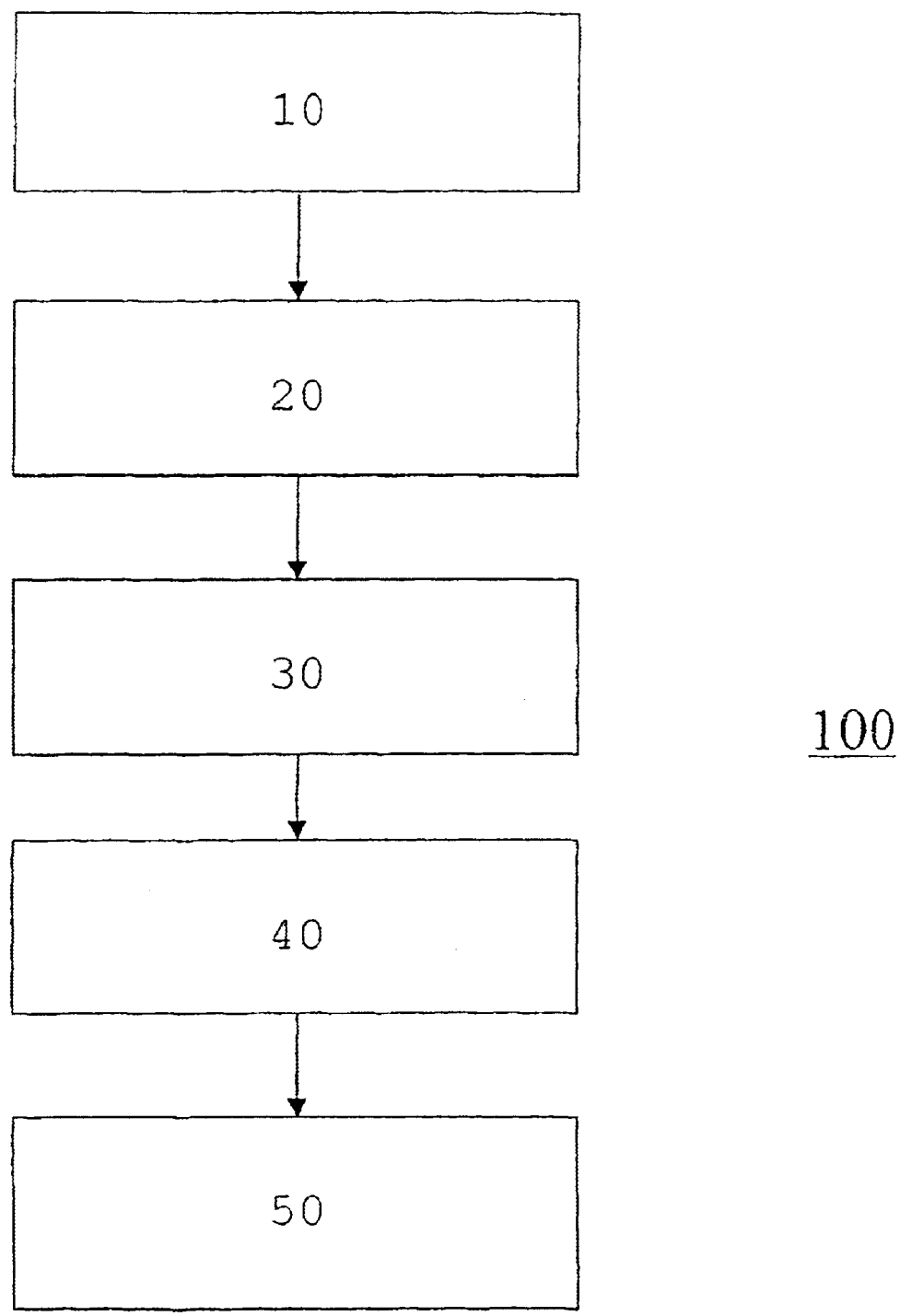
FIG. 1 is a flow chart illustrating the method steps according to one embodiment of the present invention.

FIG. 1 shows a flow chart 100 of the method steps according to one embodiment of the present invention. The first step 10 of the inventive method is made up of identifying the milking animal, which milking animal may be any type of milking animal. The identification is suitably performed when the animal enters a milking stall according to technique well known for a man skilled in the art and therefore does not need to be more deeply discussed here.

After the milking animal has been identified, a procedure for cleaning its teats and/or udder starts which is the second step 20 according to the inventive method. The cleaning is also performed according to technique well known for a man skilled in the art.

After the identification and cleaning steps are finished, images of the teats and/or udder of the milking animal are captured, which is the third step 30 according to the inventive method. Capturing images of the udder and/or the teats of the milking animal may be performed with one or a plurality of cameras. The cameras are preferably digital cameras but of course standard cameras using standard films or analogue cameras with frame grabber may be used. If standard cameras are used the capturing of images may later on be digitalised by, for example, scanning the captured images according to well known techniques.

The captured images of the udder and/or teats of the milking animal are then stored in a database, which is a fourth step 40 according to the inventive method. The captured images may be analysed and examined at any time after the milking event of the milking animal, which is a fifth step 50 according to the inventive method. Together with the captured image(s) of the udder and/or teats of the milking animal, additional data may be stored in the database, such as when the specific animal was milked, the number of times the animal has been milked during the last day, week, month or year, the movability of the animal, that is, how much the animal moves in the stall, for instance during application of the teat cups, information about previous injuries etc. If an animal moves a lot during the application of the teat cups it may indicate that at least one of the teats is injured.

The farmer may, for instance based on the additional information exemplified above, select some (a subset) of the captured images of the milking animals and examine them later. Alternatively, a computer programme is provided which compares pixels of one captured image with corresponding pixels of another captured image. If a number higher than a predetermined value of those pixels differ from each other in colour, the image is marked for the farmer so he can examine and analyse the image further.

Instead of comparing pixel by pixel, groups of pixels may be compared with each other, i.e. area(s) of one captured image taken at a first milking event is compared with corresponding areas of another captured image taken at a second milking event. If, for example, the size of the area of one captured image is bigger or smaller than a corresponding area of another captured image, said one captured image(s) of teats and/or udder of the animal is marked so the farmer can analyse and examine the captured images at a later occasion. Alternatively, the colour of a group of pixels may be compared with each other, i.e. the colour of an area of one captured image is compared with the colour of the corresponding area of another captured image taken at a different milking event.

Instead of first identifying the animal and thereafter clean its teats and/or udder, the teats and/or udder may first be cleaned and thereafter the identification of the milking animal may take place. Alternatively, the identification and cleaning of the teats and/or udder take place simultaneously.

Figure 2A:
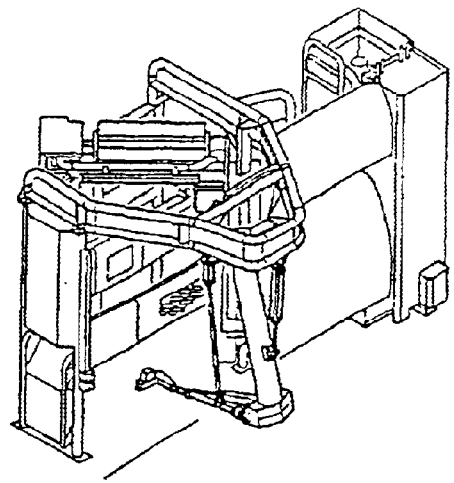
FIG. 2a is a perspective view of a milking machine in which the apparatus and the method according to the invention may be implemented.

FIG. 2a is a perspective view of a milking machine 200 in which the apparatus and the method according to the invention may be implemented. The milking machine comprises a multipurpose arm 210 which will be further described below. The milking machine 200 comprises a milking stall in which the milking procedure of the milking animal will take place. The milking stall comprises an entrance gate and an exit gate at a far long side of the milking machine 200.

Figure 2B:
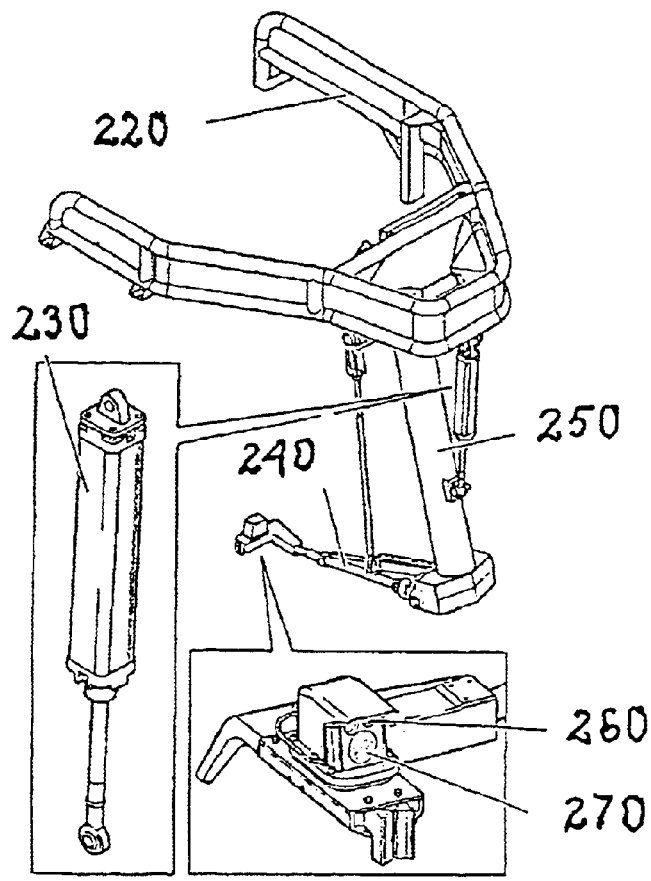

FIG. 2b is a perspective view of an enlargement of the multipurpose arm in the milking machine 200 as shown in FIG. 2a. The multipurpose arm 210 comprises a bracket 220 fixed to the milking stall walls of the milking machine 200, pneumatic cylinders 230, a lower arm 240, an upper arm 250, lasers 260 and a video camera 270. The general function of the multipurpose arm 210 is to locate teats and attach teat cups. Locating teats and teat cup attachment involve three basic steps: 1) fetching cups from a magazine, 2) locating and recognising teats, and 3) attaching the cups. The arm 210 is moved by the pneumatic cylinders 230, and uses two lasers 260 and the video camera 270 to locate and recognise the teats. The bracket 220 is a fixed, supportive structure, mounted on a frame of the milking machine 200. The bracket 220 holds the upper arm 250, which in turn holds the lower arm 240. The upper arm 250 and the lower arm 240 are movable.

The milking machine is connectable to a computer which is used to automatically identify and automatically milk each milking animal to be milked. The computer may also be used for storing captured images of the milking animal(s) to be milked and may also have a programme for comparing different images of at least a part of the milking animal with each other.

Figure 3:
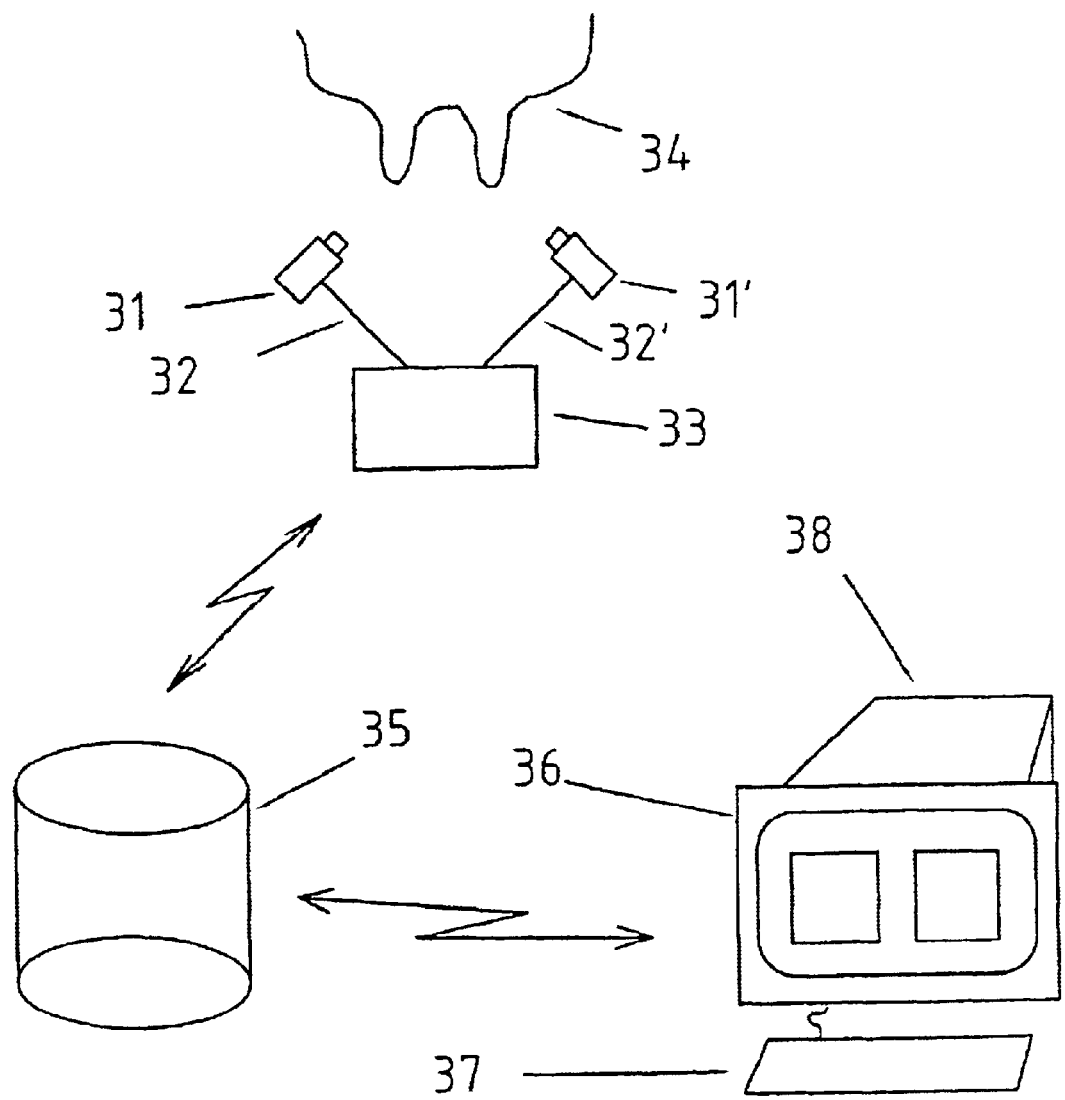
FIG. 3 is a schematic view showing a preferred embodiment of the invention.

FIG. 3 is a schematic view of a preferred embodiment of the invention. A camera 31 is positioned on a robot arm 32 and controlled by a control device 33. The control device 33 also controls the robot arm 32 as well as other equipment normally associated with an automatic milking machine, but not shown in FIG. 3. The camera may take different positions, as indicated by reference numerals 31' and 32', in relation to the udder 34 of a milking animal. The milking animal is in a conventional manner enclosed in a milking stall (not shown), having entry and exit gates, during the milking. The automatic milking machine also conventionally comprises different sensors (not shown) communicating with the control device 33 for recording various aspects of the milking procedure. Particularly an identification device (not shown) is present for determining the identity of the animal to be milked.

The control device 33 communicates with a database 35 for storing images captured by the camera 31 in association with the identity of the animal. An ordinary computer having a screen 36 suitable for displaying images and a keyboard 37 communicate with the database 35.

The animal presents itself to the automatic milking machine, is identified, and the identity of the animal is recorded in the control device 33. The control device 33 causes the robot arm 32 and the camera 31 to move to a position where the camera can capture a first image of the teats of the animal. The control device uses the camera 31 together with computer algorithms to determine the position of the teats of the animal according to conventional technology. Alternatively, it would be possible to use only historical data about the position of the udder and teats, or some other sensor means than the camera 31.

With reference to FIG. 4, representing a table of the database 35 in FIG. 3, a captured image is stored as a first record 41 with field ID equal to 11 indicating that the animal has identity 11, and that the image is captured on 2001-01-02 at 08.15 hrs as indicated by the respective fields. The image itself is stored as a BOB (Binary OBject) in the field Image.

The procedure is repeated and a further record is stored in the table as record 42. This image is also showing the same animal as record 41, since the field ID is equal, but the image is captured 1 minute later. The second image, stored in record 42, is captured with the robot arm in the position indicated with dotted lines in FIG. 3, thus depicting the teats from a different view. Alternatively, according to other preferred embodiments, the two images may show the teats before and after cleaning, before and after milking, before teat cup application and after teat cup application, thus showing the attached teat cup, etc.

After the milking is completed for this particular animal, having ID=11, the CELL COUNT, as measured for the extracted milk, is recorded in the database.

Two more records 43 and 44 are shown in the table of FIG. 4 indicating images captured at a later time when the animal having ID=11 presented itself again to the automatic milking machine. The database may of course comprise many more images of the teats of the animal from the same occasion, or from several different occasions.

At yet a later time the farmer is using the computer 38, FIG. 3, for viewing the captured images stored in the database 35. The farmer selects the animals having the greatest spread in Cell Count between two milking runs using the keyboard 37. The selection is performed using a graphic interface, but may equally well be performed with for instance SQL (Standard Query Language). Four records with four images are returned from the query, all of the animal with ID=11.

The images associated with the particular animal are presented on the screen 36 together with additional data, such as comments, orders, ID, date, time etc. When the image has been presented to the farmer, a flag is set in the database indicating that the image has been presented. This flag may be used to present only those images, which have not been presented before.

The farmer views the images using the screen 36 two at a time and may, for instance, note that the teats are particularly dirty and that one of the teats has an injury. He thus chooses to record an order in the database, namely to "Separate", meaning that the particular animal will be separated from the rest of the herd, which order is stored in the ORDER/COMMENTS field as indicated in FIG. 4.

The query may of course return more than four records, and the farmer may then view the associated images one after the other, two and two in pairs or in any other configuration. It is of course also possible to use different selection criteria which would return, for instance, all animals milked during the day, animals milked during a specific time interval, an animal with a specific identity, animals which are in heat, animals which are specifically susceptible to injury, animals having an already discovered injury, animals with high bacteria in the milk, animals with cell count above a specific value, animals with milk yield above or below a specific value, animals of a specific age etc. To achieve this, additional fields in the table may be required.

When the animal having ID=11 presents itself to the automatic milking machine again, the control device 33 looks up the identity of the animal in the database 35. The look-up is performed for all animals presenting themselves for milking. Since the order "Separate" is recorded for the animal having ID=11, the ordinary milking procedure is aborted and the animal is led to a separate enclosure easily accessible to the farmer. Other actions may also be ordered by the farmer and taken by the control device 33, such as, performing enhanced cleaning of the teats of the animal, applying a disinfectant, a sunscreen or a lotion to the teats of the animal, performing enhanced cleaning of the milking equipment after milking of the animal, separating the extracted milk etc.

The term database, as used herein, shall be construed in a broad fashion, such that, not only, for instance commercial relational databases, but also databases for instance in the form of comma delimited data is incorporated. The word database is thus used herein as a common representation for structured data, from where it is possible to fetch specific items or records.

What is claimed is:

1. A method for examining an animal belonging to a herd of animals being milked in a milking system including at least one automatic milking machine and where said animal presents itself for milking in said automatic milking machine, comprising the steps of:

identifying said animal by means of an identification device, for establishing the identity of said animal, receiving a first input from a user and storing said input in a database in relation to said animal identity, identifying the position of the teats of said animal, automatically capturing at least a first image of the teats, using information about the position of the teats, by means of a camera device, storing said at least first image in a database in relation to at least the identity of said animal, for later retrieval, retrieving said at least first image from said database upon request from the user selecting said stored image, presenting said at least first image on a viewing device in a form suitable for visually inspecting the teats using said captured at least first image, receiving a second input from said user indicating the selection of said animal having the identity associated with said image, storing said second input in association with said animal identity, performing an animal related action using said automatic milking machine on said animal presenting itself to said automatic milking machine depending on said stored second input.

2. The method according to claim 1, further comprising the steps of:

storing at least two images of the teats of said animal in the database in relation to said animal identity, retrieving a subset of said stored images upon request from said user, presenting said subset on said viewing device in a form where said user can compare at least two images.

3. The method according to claim 2, wherein said user can select said image or subset of said images depending on a variable selected from a group of variables including: time, animal identity, heat, susceptibility to injury, discovered injury, high bacteria count, high cell count, milk yield, milk quality, whether said image or subset has been presented to said user before, or animal age.

4. The method according to claim 1, wherein said position identification of said teat is done with said camera device.

5. The method according to claim 1, wherein said position identification of said teat is done according to historic data stored in the database in association with said animal identity.

6. The method according to claim 1, further comprising the step of presenting the identity of said animal together with the image on said viewing device.

7. The method according to claim 1, further comprising the step of storing in said database a flag, in relation to said stored image, indicating if said stored image has been presented to the user.

8. The method according to claim 1, further comprising the step of storing a date and a time for capture of said image in said database in relation to said animal identity.

9. The method according to claim 1, wherein a new image is captured and stored in the database at selected occasions.

10. The method according to claim 9, wherein a new image is captured and stored each time said animal presents itself to the automatic milking machine.

11. The method according to claim 1, wherein at least two new images are captured and stored each time said animal presents itself to said automatic milking machine, and wherein said at least two new images display said teat from different views.

12. The method according to claim 1, wherein said animal related action is selected from a group of actions including: guiding said animal to an enclosure, performing enhanced cleaning of the teats of said animal, applying a disinfectant to said teats of said animal, applying a lotion to said teats of said animal, applying a sunscreen to said teats of said animal, performing enhanced cleaning of milking equipment after milking of said animal.

13. The method according to claim 1, wherein said viewing device is a personal computer comprising a screen.

14. An apparatus for examining at least a first animal belonging to a herd of animals being milked in a milking system where said at least said first animal presents itself for milking in said apparatus, said apparatus comprising:

a camera positioned on a robot arm and controlled by a control device, the control device controlling the robot arm, and the camera being movable to different positions in relation to an udder of the milking animal, a data base for storing images captured by the camera, and a computer for communicating with said database, the computer having software for comparing pixels of one of the images with corresponding pixels of another of the images, and presenting said images.

15. An automatic milking machine for examining an animal belonging to a herd of animals being milked in a milking system where said animal presents itself for milking in said automatic milking machine, said automatic milking machine comprising:

a camera positioned on a robot arm and controlled by a control device, the control device controlling the robot arm, and the camera being movable to different positions in relation to an udder of the milking animal, a data base for storing images captured by the camera, and a computer for communicating with said database, the computer having software for comparing pixels on an area of one of the images with the pixels on a corresponding area of another of the images, and presenting said images.

16. A method for examining an animal belonging to a herd of animals being milked in a milking system including at least one automatic milking machine and where said animal presents itself for milking in said automatic milking machine, comprising the steps of:

identifying said animal by means of an identification device, for establishing the identity of said animal, receiving a first input from a user and storing said input in a database in relation to said animal identity, identifying the position of the teats of said animal, cleaning of the teats, and thereafter automatically capturing at least a first image of the teats, using information about the position of the teats, by means of a camera device, storing said at least first image in a database in relation to at least the identity of said animal, for later retrieval, retrieving said at least first image from said database upon request from the user selecting said stored image, presenting said at least first image on a viewing device in a form suitable for visually inspection of the teats using said captured at least first image, receiving a second input from said user indicating the selection of said animal having the identity associated with said at least first image, storing said second input in association with said animal identity, performing an animal related action using said automatic milking machine on said animal presenting itself to said automatic milking machine depending on said stored second input.

17. A method for examining an animal belonging to a herd of animals being milked in a milking system including at least one automatic milking machine and where said animal presents itself for milking in said automatic milking machine, comprising the steps of:

identifying said animal by means of an identification device, for establishing the identity of said animal, receiving a first input from a user and storing said input in a database in relation to said animal identity, identifying the position of the teats of said animal, automatically capturing two images of the teats, using information about the position of the teats, by means of a camera device, storing said two images in a database in relation to at least the identity of said animal, comparing pixels on an area of one of the two images with the pixels on a corresponding area of the other of the two images, retrieving a subset of said stored two images from said database upon request from the user selecting said stored images, presenting said subset on a viewing device in a form suitable for visually inspection and comparison of said two images of the teats by the user, receiving a second input from the user indicating the selection of said animal having the identity associated with said two images, storing said second input in association with said animal identity, performing an animal related action using said automatic milking machine on said animal presenting itself to said automatic milking machine depending on said stored second input.

* * * * *